US006865335B2

(12) United States Patent
Paritsky et al.

(10) Patent No.: US 6,865,335 B2
(45) Date of Patent: Mar. 8, 2005

(54) OPTICAL MICROPHONE FOR COMMUNICATION AND OTHER DEVICES

(75) Inventors: Alexander Paritsky, Modi'in (IL); Alexander Kots, Ashdod (IL)

(73) Assignee: Phone-Or Ltd., Or Yehuda (IL)

( * ) Notice: Subject to any disclaimer, the term of this patent is extended or adjusted under 35 U.S.C. 154(b) by 168 days.

(21) Appl. No.: 10/296,760

(22) PCT Filed: Mar. 25, 2002

(86) PCT No.: PCT/IL02/00240

§ 371 (c)(1),
(2), (4) Date: Nov. 27, 2002

(87) PCT Pub. No.: WO02/080616

PCT Pub. Date: Oct. 10, 2002

(65) Prior Publication Data

US 2003/0128958 A1 Jul. 10, 2003

(51) Int. Cl.[7] ........................ H04R 31/00; H04R 23/00; G02F 1/335

(52) U.S. Cl. ............................ 385/901; 385/7; 381/172

(58) Field of Search ............................ 385/7, 146, 901; 381/172

(56) References Cited

U.S. PATENT DOCUMENTS 4,924,085 A * 5/1990 Kato et al. ............. 250/227.28

FOREIGN PATENT DOCUMENTS

| | | | |
|---|---|---|---|
| EP | 0866312 A1 * | 9/1998 | .......... G01D/65/26 |
| EP | 1191812 A1 * | 3/2002 | ........... H04R/23/00 |
| WO | WO 2087278 A2 * | 10/2002 | |

* cited by examiner

*Primary Examiner*—Akm Enayet Ullah
*Assistant Examiner*—Omar Rojas
(74) *Attorney, Agent, or Firm*—G.E. Ehrlich Ltd.

(57) ABSTRACT

A lightwaveguide panel to be used with a a mobile telephone (MT) or personal digital assistant (PDA), the pannel comprises a first portion for lighting an LCD and/or a keyboard, and a second integral portion, said second portion including a first inclined surface for directing light from a source of light onto a light-reflecting acoustically responsive membrane, and a second inclined surface for directing light from said membrane onto a photo-detector.

18 Claims, 4 Drawing Sheets

OPTICAL MICROPHONE FOR COMMUNICATION AND OTHER DEVICES

FIELD OF THE INVENTION

The present invention relates to optical microphones and, in particular, to a light waveguide panel used in communication and other devices having displays and key-boards, such as mobile telephones (MT's), personal digital assistants (PDAs), and the like. The invention also relates to an assembly incorporating an optical microphone in such a light waveguide panel.

BACKGROUND OF THE INVENTION

Known communication and other devices, such as MTs, PDAs, and the like, use visual displays to relay information and keyboard panels as input and operating means. In these devices, both the visual displays and the key-board panels function as light waveguides, which constitute a major feature of their operation and construction. The devices allow the use of surrounding light and/or light produced by internal light sources to illuminate their displays and key-board panels, thus enabling the reading and writing of input/output information.

In addition, these devices are intended to be utilized with the input of audio information (speech), using ordinary microphones.

DISCLOSURE OF THE INVENTION

It is therefore a broad object of the present invention to provide an optical microphone built into displays or key-board panels mobile telephones (MTs), personal digital assistants (PDAs), and similar devices.

The invention therefore provides a light waveguide panel to be used with a mobile telephone (MT) or a personal digital assistant (PDA), the panel comprising a first transparent portion configured to be interposed between a light source and an LCD or keyboard for lighting the LCD and/or keyboard, and a second integral transparent portion, the second portion including a first inclined surface oriented for directing light from a source of light onto a light-reflecting acoustically responsive membrane, and a second inclined surface oriented for directing light from the membrane onto a photodetector.

The invention further provides an assembly for a mobile telephone (MT) or a personal digital assistant (PDA) having an LCD board and/or keyboard; a first light source for said LCD board and/or keyboard, and an optical microphone including a second light source, a light-reflecting, acoustically responsive membrane and a photodetector, the assembly comprising a light waveguide panel having a first transparent portion interposed between said first light source and said LCD board and/or keyboard for lighting the LCD and/or keyboard; and a second, integral, transparent portion disposed between the second light source and the light-reflecting membrane; the second, integral portion including a first surface for directing light from the second light source to the light-reflecting membrane, and a second surface for directing light reflected from the membrane onto the photodetector.

BRIEF DESCRIPTION OF THE DRAWINGS

The invention will now be described in connection with certain preferred embodiments with reference to the following illustrative figures so that it may be more fully understood. With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the Drawings.

DETAILED DESCRIPTION OF THE INVENTION

Figure 1:
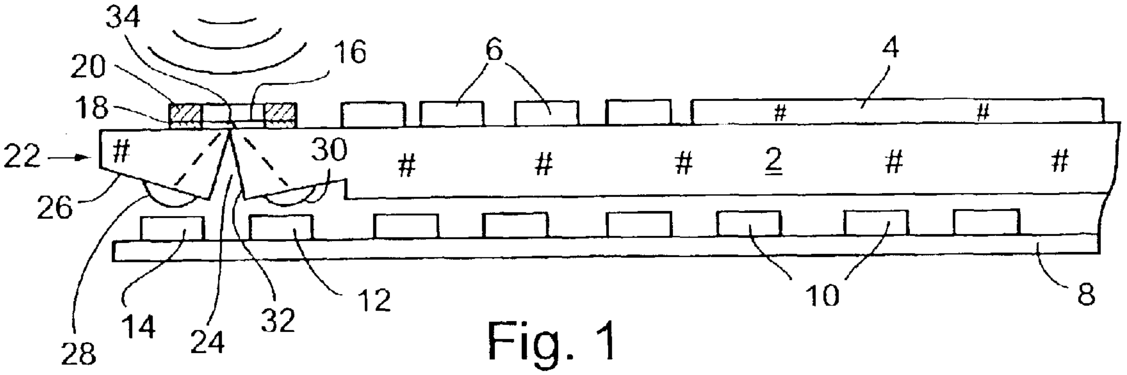
FIG. 1 is a cross-sectional view of a portion of a mobile telephone (MT) device with its housing removed, exposing a light waveguide panel in accordance with a first embodiment of the present invention.
Figure 2:
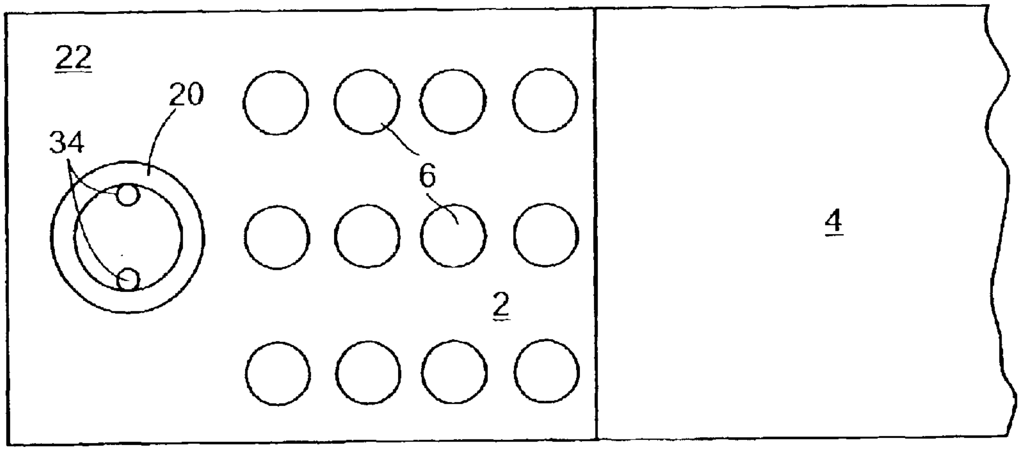
FIG. 2 is a plan view of the embodiment of FIG. 1

FIG. 1 illustrates, in cross-section, a portion of an MT without its housing in accordance with the present invention. Shown are an at least partly transparent light waveguide panel 2; a liquid crystal display (LCD) having a glass board 4; keyboard 6; electronic board 8 bearing light sources 10, e.g., LEDs; a photodetector 12 and a source of light 14. On the upper surface of panel 2 is mounted an acoustically responsive membrane 16, affixed between a disc-shaped spacer 18 and a disc 20. Membrane 16 is mounted in alignment with the source of light 14 and photodetector 12.

Figure 3:
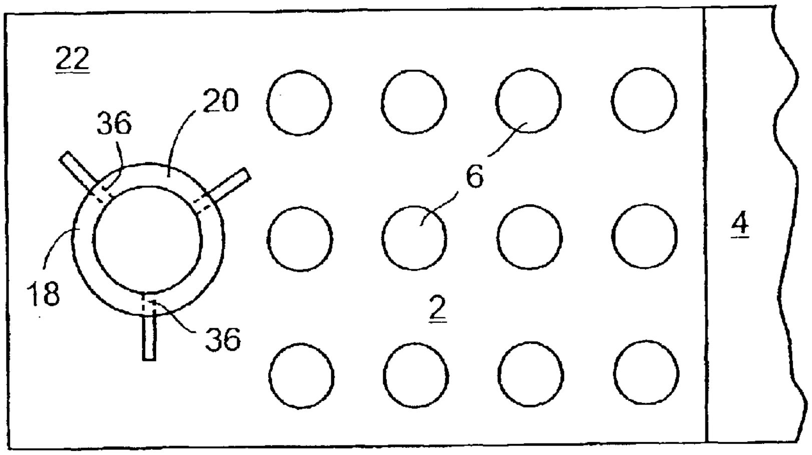
FIG. 3 is a plan view of a second embodiment of the invention, similar to the panel of FIG. 1, additionally furnished with pressure-equalizing holes.

A portion 22 of light waveguide panel 2, between membrane 16, source of light 14 and photodetector 12, is configured to include a pyramidal cutout 24 surrounded by an annular, inclined surface 26 comprising lenses 28, 30 located adjacent to the source of light 14 and phtodetector 12, respectively. The pyramidal surface of cutout 24 is advantageously coated with an opaque material 32 or, alternatively an opaque partition (not shown) may be inserted into pyramidal cutout 24 so as to prevent light from passing into portion 22 between the light waveguide walls, allowing it to pass only through lenses 28, 30. Pyramidal cutout 24 may advantageously form holes 34 in the light waveguide portion under membrane 16, so as to form a vertical air passage between the space below the membrane 16 and the atmosphere, for obvious reasons. Instead of holes 34 made in panel 2, one or more horizontally directed holes or channels 36 may be made in spacer 18 and/or in portion 22 of the waveguide panel, as shown in FIG. 3.

Figure 4:
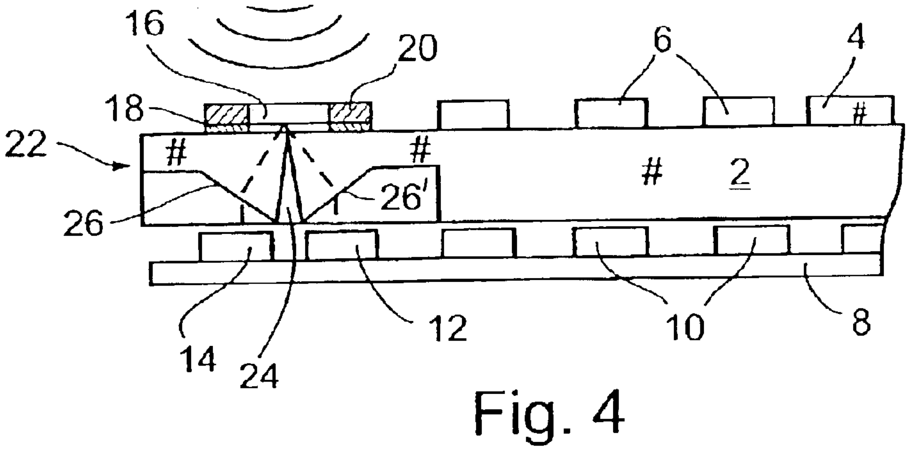
FIGS. 4 to 13 are cross-sectional and plan views of further embodiments of the present invention.

Referring now to FIG. 4, there is illustrated a modification of the light waveguide panel of FIG. 1, in which the light waveguide portion 22 is made without lenses 28, 30. Instead, the inclined surface 26 or surfaces 26, 26' are configured with an inclination angle calculated to direct light beams from the source of light 14 onto membrane 16, and the reflected beams onto photodetector 12.

Figure 5:
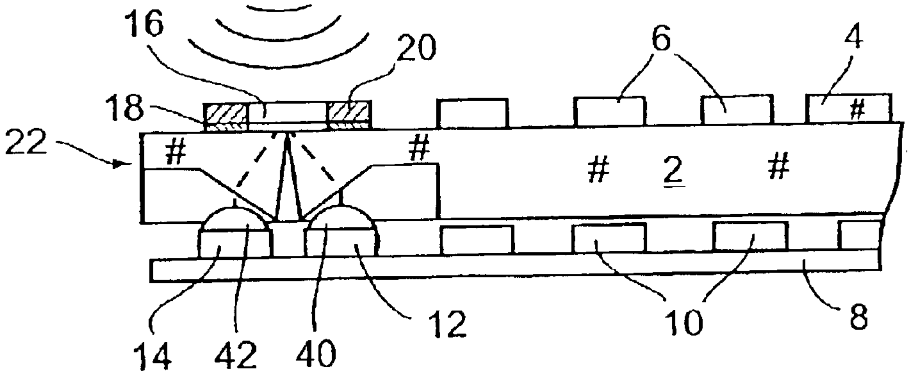

FIG. 5 illustrates a further embodiment similar to that of FIG. 4, however, having lenses 40, 42, respectively, affixed onto, or made integrally with, the source of light 14 and photodetector 12.

Figure 6:
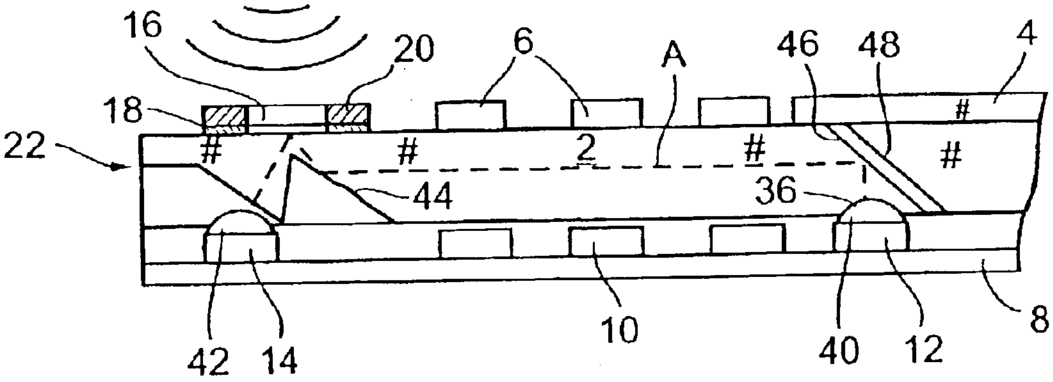
Figure 7:
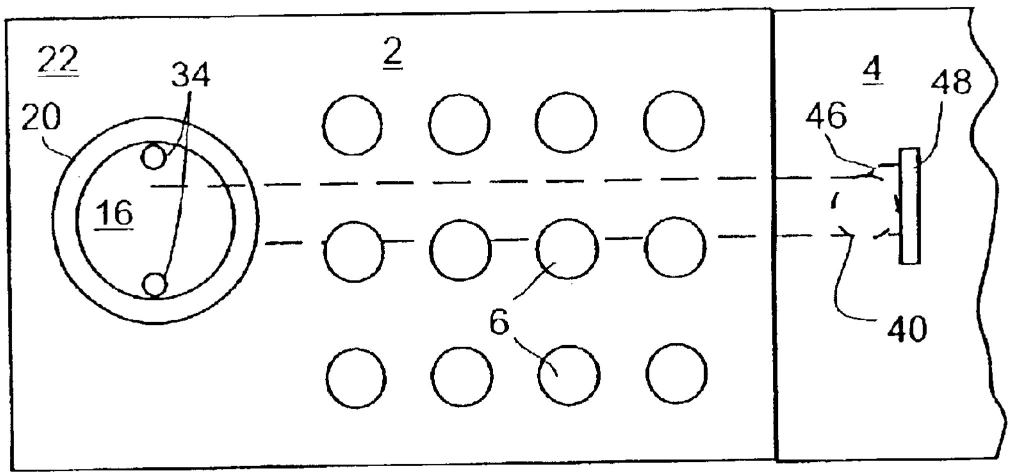

Referring to FIGS. 6 and 7, in this embodiment the source of light 14 and photodetector 12 are disposed in spaced-apart relationship. Light reflected from the membrane 16 impinges on incline 44, which, contrary to the previous embodiments, faces a direction opposite portion 22 so as to reflect the light along axis A of the panel to meet an additional inclined surface 46 reflecting the light in the direction of lens 36 of photodetector 12. This configuration is useful in cases where stray radio frequency interference exists. In such cases, photodetector 12 should be placed adjacent to electronic processing circuits, while the other parts of the microphone, e.g. the light source 14 and membrane 16, are of necessity located father away in consideration of the user's mouth. In order to achieve improved reflection of light, a second, inclined surface 48 may be provided parallel to and in spaced-apart relationship from surface 46, forming an air gap between the two inclined surfaces for improving light reflection.

Figure 8:
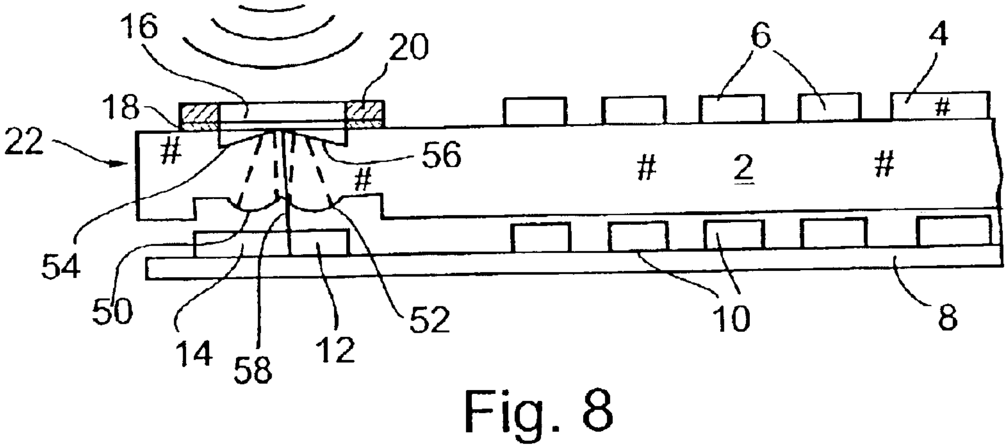

A yet further embodiment of the invention is illustrated in FIG. 8. Accordingly, lenses 50, 52 are formed on one surface of the panel portion 22, while the inclined surfaces 54, 56 are formed on its opposite surface. An opaque partition 58 is placed between the light source 14, photodetector 12, the two lenses 50, 52 and the two inclined surfaces 54. 56.

Figure 9:
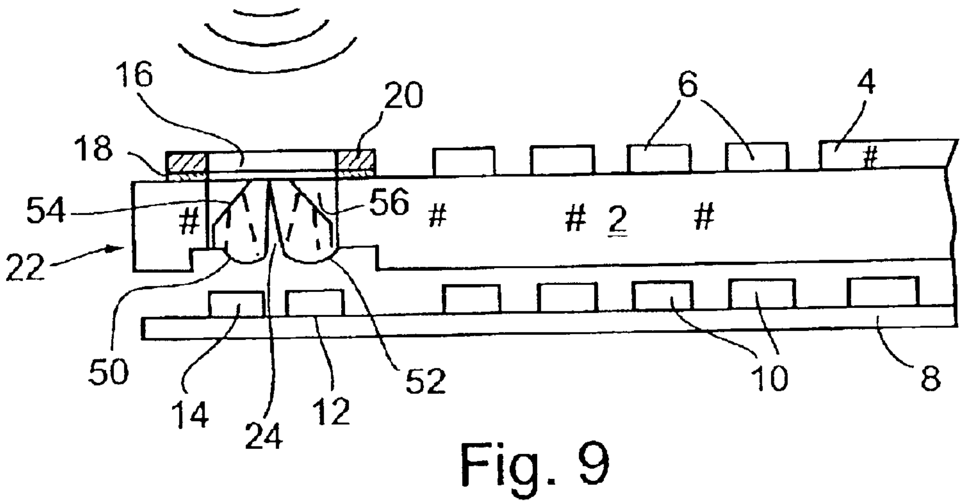

FIG. 9 depicts a modification of the embodiment of FIG. 8, in which, instead of partition 58, a pyramidal cutout 24 is made between lenses 50, 52, and the inclined surfaces 54,56 are much steeper.

Figure 10:
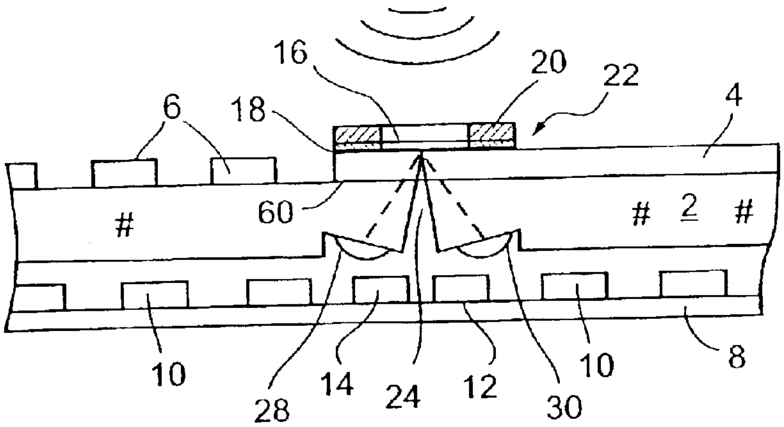
Figure 11:
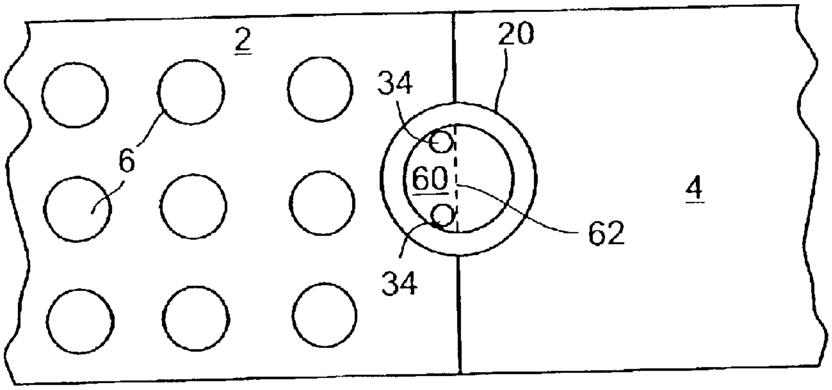

FIGS. 10 and 11 illustrate a still further embodiment of the invention, in which the membrane 16 of the optical microphone is partly affixed on a section of the LCD display board 4, and a half-disk-shaped insert 60 is placed on keyboard 6. As is known, LCDs are usually made of glass, which is difficult and costly to work into a desired configuration. Thus insert 60 is mounted adjacent to the glass plate of the LCD display board 4, and the membrane attached to spacer 18 is affixed on both the display board 4 and insert 60, the edges of which abut each other along line 62 of FIG. 11 Light directed onto and reflected from the membrane 16 passes through member 60 and the portion of display 4 located underneath the membrane. Obviously, the arrangement of FIGS. 10 and 11 can be incorporated into anyone of the embodiments of the light waveguide panel shown in FIGS. 3 to 9.

Figure 12:
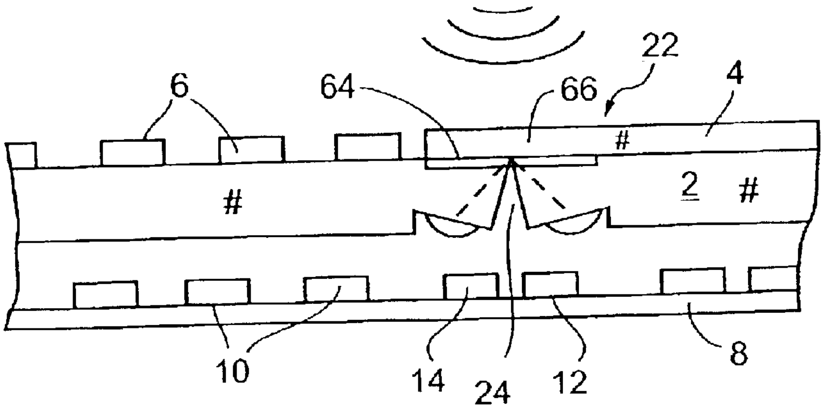

FIG. 12 illustrates a further embodiment, similar to that of FIGS. 10 and 11, except for the construction of the microphone's membrane assembly. Here, the microphone membrane comprises glass display LCD board 4 coated with a light-reflecting substance, such as thin aluminium or gold layer 64 covering a portion 66 of the glass.

Naturally, the sensitivity of this type of membrane is relatively low, and such a construction requires the use of a high-power light source, such as that of a laser.

Figure 13:
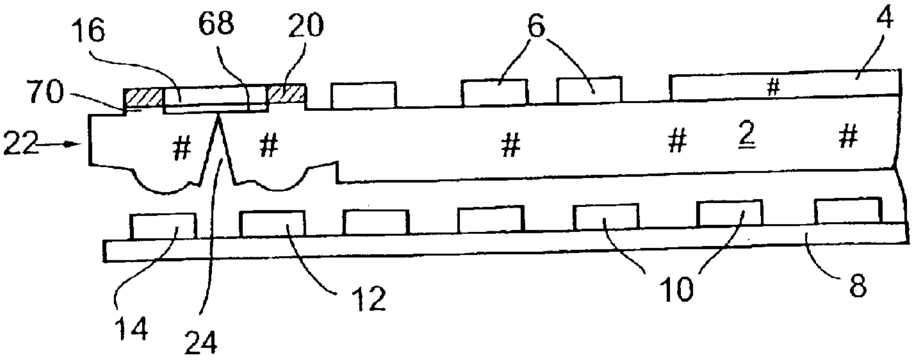

In the embodiment of FIG. 13, the spacer 18, e.g., as shown in FIG. 1, is eliminated by the formation of a recess 68 in panel portion 22 below the membrane 16, thereby effectively producing a raised annulus 70 acting as a spacer onto which membrane 16 is affixed. Obviously and conversely, the panel portion 22 may be formed with raised portions for mounting the membrane 16 is spaced relationship to the surface of the panel beneath it.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing discription, and all changes which come within the meaning and range of equivalency of the claims are therefore intended to be embraced therein.

What is claimed is:

1. A light waveguide panel to be used with a mobile telephone (MT) or personal digital assistant (PDA), said panel comprising:

a first transparent portion configured to be interposed between a light source and an LCD or keyboard for lighting said LCD and/or keyboard, and a second integral transparent portion, said second portion including a first inclined surface oriented for directing light from a source of light onto a light-reflecting acoustically responsive membrane, and a second inclined surface oriented for directing light from said membrane onto a photo-detector.

2. The light waveguide panel as claimed in claim 1, wherein said inclined surfaces and adjacent panel portions are optically separated to prevent light from passing directly between them.

3. The light waveguide panel as claimed in claim 2, wherein said inclined surfaces and adjacent panel portions are separated from each other by an air gap.

4. The light waveguide panel as claimed in claim 2, wherein said inclined surfaces and adjacent panel portions are separated from each other by an optically opaque partition.

5. The light waveguide panel as claimed in claim 1, further comprising a lens attached to, or integrally made with, at least one of said inclined surfaces.

6. The light waveguide panel as claimed in claim 1, wherein said inclined surfaces are formed on one side of said panel and are configured to direct light from said source of light onto a photo-detector located on the same side of said panel.

7. The light waveguide panel as claimed in claim 1, wherein said second inclined surface is configured to direct light from said membrane toward an inclined reflecting surface of said panel at a location spaced apart from said second inclined surface.

8. The light waveguide panel as claimed in claim 1, wherein at least one of said first and second inclined surfaces is formed at a side of the panel facing towards said membrane.

9. The light waveguide panel as claimed in claim 1, wherein said membrane is affixed on said panel by means of a spacer forming an air gap, allowing the movement of said membrane under the influence of acoustic pressure.

10. The light waveguide panel as claimed in claim 1, wherein said membrane is affixed on at least one light-transmitting layer disposed on said panel.

11. The light waveguide panel as claimed in claim 1, wherein said membrane is constituted by a glass layer covered with a film of a light-reflecting substance.

12. The light waveguide panel as claimed in claim 1, wherein said membrane is affixed on raised portions of said panel so as to form a space between the membrane and said panel, facilitating the movement of said membrane under acoustic pressure.

13. An assembly for a mobile telephone (MT) or a personal digital assistant (PDA) having an LCD board and/or a keyboard; a first light source for said LCD board and/or keyboard, and an optical microphone including a second light source, a light-reflecting, acoustically responsive membrane and a photodetector, said assembly comprising:

a light waveguide panel having a first transparent portion interposed between said first light source and said LCD board and/or keyboard for lighting said LCD and/or keyboard; and a second, integral, transparent portion disposed between said second light source and said light-reflecting membrane;

said second, integral portion including a first surface for directing light from said second light source to said light-reflecting membrane, and a second surface for directing light reflected from said membrane onto said photodetector.

14. The assembly as claimed in claim 13, wherein said second light source and said photodetector are disposed on one, first side of said panel.

15. The assembly as claimed in claim 14, wherein said membrane is mounted on the second side of said panel opposite to said first side.

16. The assembly as claimed in claim 13, wherein said membrane is mounted partly on said LCD board and partly on an insert mounted on said keyboard, in spaced-apart relationship from them.

17. The assembly as claimed in claim 13, wherein said second, integral portion of said panel is located at one of its sides.

18. The assembly as claimed in claim 13, wherein said second, integral portion of said panel is located intermediate said first portion.

* * * * *